Figure 1:
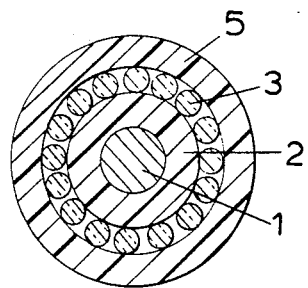

OR 4,037,923

United States Patent
Beal

4,037,923
July 26, 1977

[54] OPTICAL GUIDES WITH COMPRESSIBLE CELLULAR MATERIAL

[75] Inventor: Richard Ernest Beal, Wigan, England

[73] Assignee: BICC Limited, London, England

[21] Appl. No.: 482,993

[22] Filed: June 25, 1974

[51] Int. Cl.$^2$ .............................. G02B 5/14
[52] U.S. Cl. ................................ 350/96 B
[58] Field of Search .............. 350/96 B, 96 R; 117/126 GQ, 126 GB; 174/110 PM, 108, 131 R, 131 B, 113 R, 23 C

[56] References Cited
U.S. PATENT DOCUMENTS

| 2,224,149 | 12/1940 | Fisher | 117/126 GQ |
| 2,224,274 | 12/1940 | Powers | 117/126 GB |
| 2,245,620 | 6/1941 | Steinbock | 117/126 GQ |
| 2,710,275 | 6/1955 | Waggoner | 117/126 GQ |
| 3,466,928 | 9/1969 | Kind | 350/96 B |
| 3,498,286 | 3/1970 | Polanyi et al. | 350/96 B |
| 3,564,233 | 2/1971 | Cox | 350/96 B |
| 3,633,031 | 1/1972 | Pesce | 350/96 B |
| 3,668,298 | 6/1972 | Hawkins | 174/113 R |
| 3,676,576 | 7/1972 | Dubernet et al. | 174/113 R |
| 3,678,177 | 7/1972 | Lawrenson | 174/113 R |
| 3,718,515 | 2/1973 | Goldstein | 350/96 B |
| 3,830,953 | 8/1974 | Wood et al. | 174/23 C |

OTHER PUBLICATIONS

Archer, Optical Spectra, pp. 31-34, Sept., 1973.
Spie Journal, "Mechanical Characteristics of Flexible Glass Fiber Optics," by Ali et al, July, 1971, pp. 155-158.

*Primary Examiner*—Jon W. Henry
*Attorney, Agent, or Firm*—Buell, Blenko & Ziesenheim

[57] ABSTRACT

An optical guide comprises at least one optical fibre and, extending lengthwise of the guide and in contact with the optical fibre or fibres, a body of compressible cellular material, for instance in the form of at least one separately formed elongate member. The arrangement is such that when the guide is stressed in such a way as to subject the optical fibre or fibres to a tensile force, the optical fibre or each of said fibres can move transversely of the guide to compress the compressible cellular material with which it is in contact and thereby reduce the strain that would otherwise be imparted to the fibre or fibres. Preferably the optical fibres are assembled about and in contact a longitudinally central core member of which at least an outer peripheral layer is of compressible cellular material. The optical fibres may be arranged in at least two optical bundles with which are in contact with at least one longitudinally extending body of compressible cellular material, an outer protective sheath surrounding the bundles and body or bodies of compressible cellular material.

4 Claims, 6 Drawing Figures

OPTICAL GUIDES WITH COMPRESSIBLE CELLULAR MATERIAL

This invention relates to optical guides for the transmission of the ultra-violet, visible and infra-red regions of the electromagnetic spectrum, which regions, for convenience, will hereinafter all be included in the generic term "light," and especially, but not exclusively, to optical waveguides for use in the communications field adapted for transmission of light having a wavelength within the range 0.8 to 1.1 micrometers.

For the purpose of transmitting light in an optical transmission system it has been proposed to employ optical guides including one or more than one optical fibre. Each optical fibre is usually of substantially circular cross-section but in some circumstances it may be of non-circular cross-section.

Optical guides with which the invention is concerned include guides including one or more than one optical fibre of a glass or other transparent material whose refractive index is arranged to decrease over at least a part of the radius of the fibre as the distance from the axis of the fibre increases and guides including one or more than one optical fibre of composite form comprising a core of transparent material clad throughout its length with another transparent material of lower refractive index which by total internal reflection of light being transmitted along the fibre or fibres confines at least a major proportion of the light within a core. A composite optical fibre is generally, but not necessarily, made of two glasses of different refractive indices, the glass forming the core having a higher refractive index than the glass forming the cladding. In another form of composite optical fibre the core may be made of a transparent liquid having a higher refractive index than that of the cladding.

The present invention has as its principal object the provision of an optical guide which by virtue of its construction at least substantially reduces the strain that would otherwise be imparted to the optical fibres of the guide if the guide should be stressed in such a way as to tend to subject each or any of the optical fibres to a tensile force.

According to the invention the optical guide comprises one or more than one optical fibre and, extending lengthwise of the guide and in contact with the optical fibre or fibres, a body of compressible cellular material, the arrangement being such that when the guide is stressed in such a way as to subject the optical fibre or one or more off the optical fibres to a tensile force, the optical fibre or optical fibres can move transversely of the guide to compress the body of compressible cellular material with which it is or they are in contact and thereby reduce the strain that would otherwise be imparted to the fibre or fibres.

Where the guide includes a plurality of optical fibres the body of compressible cellular material may be in the form of at least one separately formed elongate member of the material that will accommodate transverse movement of optical fibres when the guide is stressed in such a way that one or more of the optical fibres is or are subjected to a tensile force. In a preferred form of optical guide of this kind the optical fibres of the guide are stranded around or otherwise assembled about and in contact with a longitudinally extending central core member of which at least an outer peripheral layer is of compressible cellular material in such a way that when the optical fibres are subjected to a tensile force some or all of the optical fibres move transversely inwardly to compress the compressible cellular material of the central member. In an alternative form of guide of this kind, a plurality of optical fibres and a plurality of elongate members of compressible cellular material are assembled together with the elongate members interspersed among and in contact with the optical fibres so that when the guide is subjected to a tensile force some or all of the optical fibres move transversely to compress the elongate members interspersed between them.

Instead of the body of compressible cellular material being in the form of at least one separately formed elongate member of the material some or all of the optical fibres of the optical guide may be embedded or partially embedded in the body of compressible cellular material in such a way that substantial relative longitudinal movement between embedded fibres is prevented. As a further alternative form of guide, each optical fibre or two or more optical fibres may be provided with a covering layer or cladding of compressible cellular material.

One or more than one non-optical reinforcing fibre or other non-optical reinforcing elongate element may be associated with the optical fibres. By the expressions "non-optical reinforcing fibre" and "non-optical reinforcing elongate element" as used in this specification and in the claims forming part thereof is meant a fibre or elongate element along which light cannot be transmitted.

The optical guide may be in the form of an optical cable comprising at least two optical bundles as hereinafter defined, at least one body of compressible cellular material extending lengthwise of the optical cable and in contact with the bundles and, surrounding the bundles and body or bodies of compressivble cellular material, an outer protective sheath, the arrangement being such that when the cable is stressed in such a way as to subject optical fibres of at least one optical bundle to a tensile force, the optical bundle can move transversely of the cable to compress the body of compressible cellular material and thereby reduce the strain that would otherwise be imparted to the optical fibres of the optical bundle.

By the expression optical bundle as used in this specification is meant a group of optical fibres or a group of fibres including a plurality of optical fibres and one or more non-optical fibres or other reinforcing elongate elements.

In one form of optical cable the optical bundles are stranded around or otherwise assembled about and in contact with a longitudinally extending central elongate member of which at least an outer peripheral layer is of compressible cellular material. In another form of optical cable the optical bundles and two or more elongate members of compressible cellular material are assembled together with the elongate members interspersed among and in contact with the optical bundles. Alternatively, or additionally, a covering layer of compressible cellular material may be provided between the optical bundles and the surrounding protective sheath.

The fibres of each of some or all of the bundles may be embedded or partially embedded in a body of compressible material or each of some or all of the optical bundles of the cable may include at least one separately formed elongate member of compressible cellular material. Each of some or all of the bundles may be surrounded by a covering layer or cladding of compressible cellular material.

The optical cable may also include one or more than one separately formed elongate reinforcing member assembled together with the optical bundles and surrounded by the protective sheath.

Where the compressible cellular material of an optical guide is in the form of at least one separately formed elongate member and it is desired to provide for a limited degree of relative longitudinal movement between the optical fibres and elongate member or members, or, in the case of optical cable, between the optical bundles and elongate member or members, the interstices of the guide or cable may be substantially filled with a greasy medium, for instance petroleum jelly.

The compressible cellular material of the elongate member or members may be of any cellular material that will be compressed when the optical fibres or optical bundles move transversely with respect to the optical guide or cable, but preferably it comprises cellular plastics material or cellular rubber.

Where it is desired to permit some relative sliding movement between optical fibres and the body or bodies compressible cellular compressible material, an appropriate slip agent may be incorporated in the compressible cellular material or the compressible cellular material may be impregnated or coated with a grease or suitable material.

Where an optical fibre, two or more optical fibres or an optical bundle, is provided with a covering layer or cladding of compressible cellular material and the compressible cellular material is a cellular polymeric material, the covering layer may be applied to the fibre or group of fibres by the method of manufacturing cellular polymeric material that is described and claimed in our British Patent No. 1,315,661.

The invention will be further illustrated by a description, by way of example, of six optical guides, each in the form of an optical cable, with reference to the accompanying diagrammatic drawings which show cross-sectional end views of the six cables, drawn on enlarged scales.

The optical cable shown in FIG. 1 comprises a reinforcing core 1 of steel having a diameter of 1.0 mm, a layer 2 of cellular polyethylene of radial thickness 0.5 mm surrounding the core 1, a stranded layer of optical fibres 3, each of a diameter of 0.14 mm, and an outer protective sheath 5 of extruded polyethylene. The cable has an overall diameter of 4.5 mm.

Figure 2:
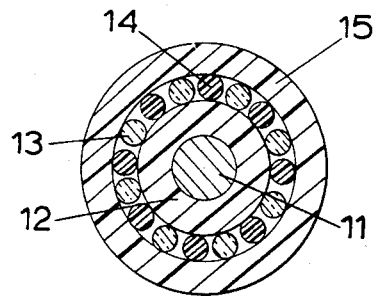

The optical cable shown in FIG. 2 has a reinforcing core 11 of steel of diameter 1.0 mm, a layer 12 of cellular polyethylene having a radial thickness of 0.5 mm which surrounds the core 11, a stranded layer comprising a plurality of optical fibres 13 and a plurality of elongate members 14 of plastics material, the optical fibres each having a diameter of 0.14 mm, and the elongate member each having a diameter of 0.14 mm, and an outer protective sheath 15 of extruded polyethylene. The cable has an overall diameter of 4.5 mm.

Figure 3:
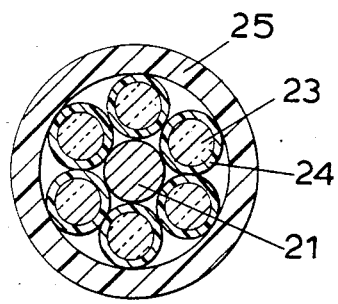

FIG. 3 illustrates an optical cable in which optical fibres 23, each having a diameter of 0.14 mm and a cladding 24 of cellular polyethylene of radial thickness 0.14 mm, are stranded around a reinforcing core 21 of steel having a diameter of 1.0 mm. The cable has an outer protective sheath 25 of polyethylene, the overall diameter of the cable being 4.8 mm.

In each of the optical cables shown in FIGS. 1 to 3 the interstices between the optical fibres and, when present, the elongate members of plastics materials may be filled with water impermeable petroleum jelly throughout the length of the cable.

Figure 4:
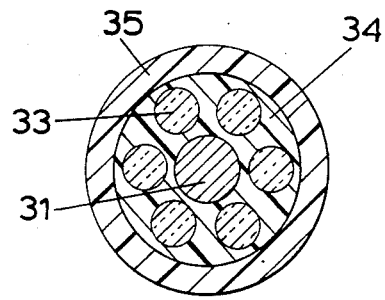

The fourth form of optical cable illustrated in FIG. 4 comprises a reinforcing core 31 of steel having a diameter of 1.0 mm, a plurality of optical fibres 33 each having a diameter of 0.14 mm, an outer protective sheath 35 of extruded polyethylene and, filling the interstices between the optical fibres, between the optical fibres and the core and between the optical fibres and the sheath throughout the length of the cable, cellular polyethylene 34. The cable has an overall diameter of 3.8 mm.

Figure 5:
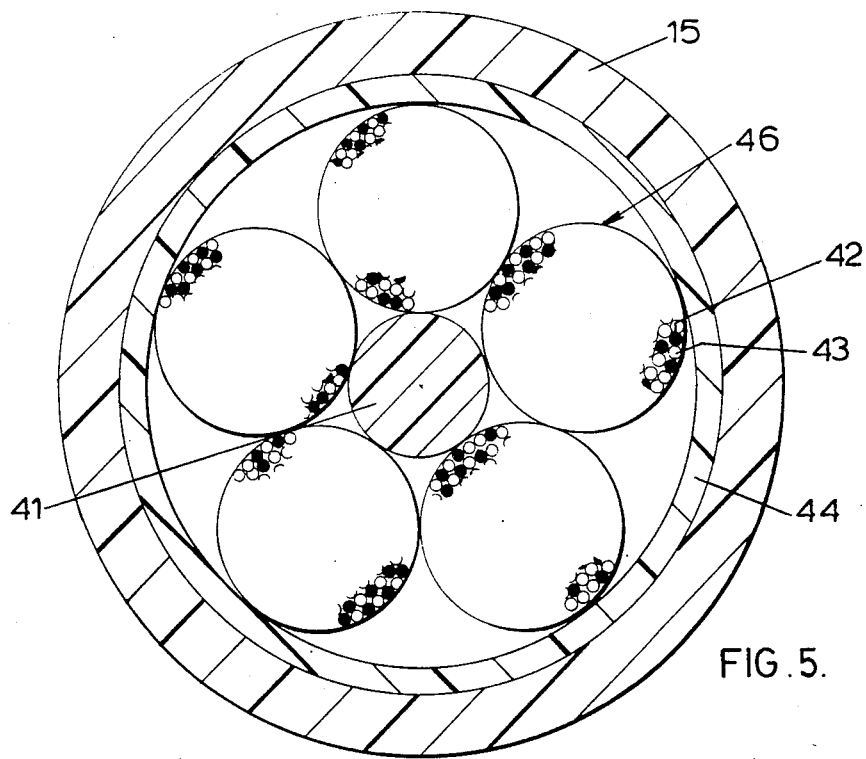

In the optical cable shown in FIG. 5 optical bundles 46 each of overall diameter 3.3 mm and comprising a plurality of optical fibres 43, and non-optical reinforcing fibres 42, are stranded around a core 41 of cellular polyethylene. A layer 44 of cellular polyethylene surrounds the stranded layer of optical bundles 46 and is itself surrounded by an outer protective sheath 45 of polythylene. The cable has an overall diameter of 14.0 mm.

Figure 6:
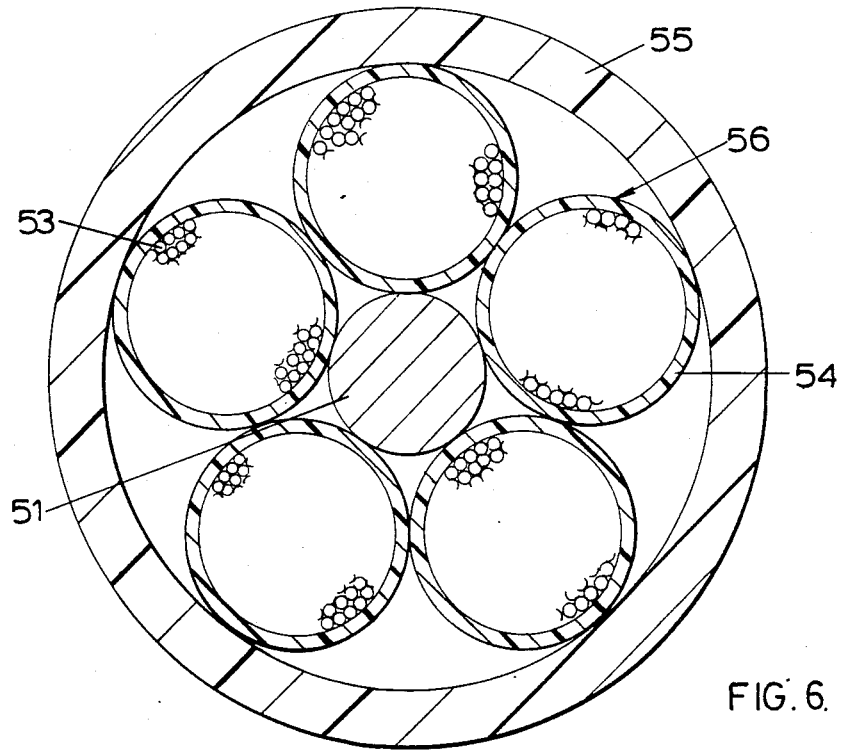

The sixth form of optical cable shown in FIG. 6 comprises a reinforcing core 51 of steel having a diameter of 0.75mm, a stranded layer of optical bundles 56 and an outer protective sheath 55 of extruded polyethylene. Each optical bundle 56 comprises a plurality of optical fibres 53, each of diameter 0.14 mm, surrounded by a layer 54 of cellular polyethylene. The cable has an overall diameter of 14.0 mm.

In each of the optical cables shown in FIGS. 5 and 6 the interstices within the optical bundles and/or the interstices between the optical bundles may be filled with water impermeable petroleum jelly throughout the length of the cable.

The optical guide of the present invention has the important advantage that if, during manufacture and installation of the guide, it is flexed to such an extent as to tend to subject each or any of the optical fibres to a tensile force, then the risk that fracture of optical fibres may occur is substantially reduced.

The provision of compressible material in the optical guide of the present invention has the additional advantage that it will absorb at least some of the transverse forces to which the guide may be subjected, thereby providing a degree of protection for the optical fibres against damage from this source.

What I claim as my invention is:

1. An optical guide consisting of an optical cable comprising at least two optical bundles, each comprising a group of fibres including a plurality of optical fibres assembled about and in contact with a longitudinally extending central elongate member of which at least an outer peripheral layer is of compressible cellular material and, surrounding the bundles and the central member, an outer protective sheath, the arrangement being such that when the cable is stressed in such a way as to subject optical fibres of at least one of the optical bundles to a tensile force, the optical bundle can move transversely inwardly to compress the compressible cellular material of the central member and thereby reduce the strain that would otherwise be imparted to said optical fibres, and a covering layer of compressible cellular material between the optical bundles and the surrounding protective sheath.

2. An optical guide consisting of an optical cable comprising at least two optical bundles, each comprising a group of fibres including a plurality of optical fibres, at least one body of compressible cellular material extending lengthwise of the optical cable and in contact with the bundles and, surrounding the bundles and said body or bodies of compressible cellular material, an outer protective sheath, the arrangement being such that when the cable is stressed in such a way as to subject optical fibres of at least one of the optical bundle to a tensile force, the optical bundles can move transversely of the cable to compress the said body or bodies of compressible cellular material with which it is in contact and thereby reduce the strain that would otherwise be imparted to said optical fibres, the interstices between the optical bundles being substantially filled with a greasy medium throughout the length of the guide.

3. An optical guide comprising at least one optical fibre and, extending lengthwise of the guide and in contact with the optical fibre or fibres, a body of compressible cellular material, the arrangement being such that when the guide is stressed in such a way as to subject the optical fibre or at least one of the optical fibres to a tensile force, the optical fibre or each of said optical fibres can move transversely of the guide to compress the body of compressible cellular material with which it is in contact and thereby reduce the strain that would otherwise be imparted to the fibre or fibres, wherein the compressible cellular material incorporates a slip agent in an amount sufficient to permit some relative sliding movement between optical fibres and the compressible cellular material.

4. An optical guide comprising at least one optical fibre and, extending lengthwise of the guide and in contact with the optical fibre or fibres, a body of compressible cellular material, the arrangement being such that when the guide is stressed in such a way as to subject the optical fibre or at least one of the optical fibres to a tensile force, the optical fibre or each of said optical fibres can move transversely of the guide to compress the body of compressible cellular material with which it is in contact and thereby reduce the strain that would otherwise be imparted to the fibre or fibres, wherein the compressible cellular material is impregnated with a grease that will permit some relative sliding movement between optical fibres and the compressible cellular material.

* * * * *

UNITED STATES PATENT OFFICE
CERTIFICATE OF CORRECTION

Patent No. 4,037,923          Dated July 26, 1977

Inventor(s) RICHARD ERNEST BEAL

It is certified that error appears in the above-identified patent and that said Letters Patent are hereby corrected as shown below:

In the Abstract, line 13, after "longitudinally" insert --extending--, line 16, after "bundle" delete --with--.

Column 2, line 36, "compressivble" should read --compressible--.

Column 3, line 24, after "cellular", delete --compressible--.

Column 3, line 56, "member" should read --members--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*